Sept. 6, 1927.
C. R. MABEE
1,641,340
APPARATUS FOR PRODUCING LIVE STOCK FEEDS
Filed Jan. 14, 1921
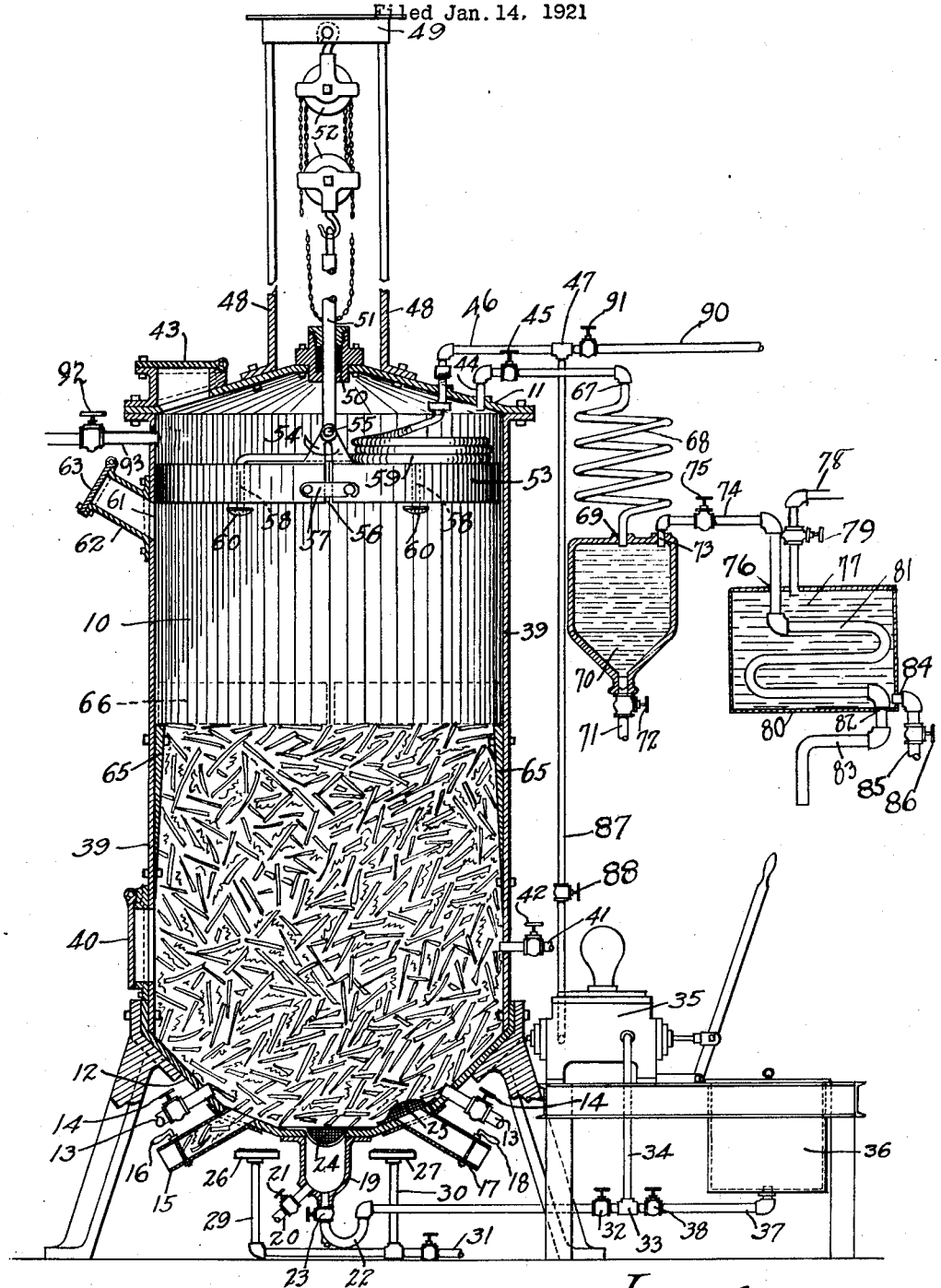
Inventor
Charles R. Mabee Patented Sept. 6, 1927.

1,641,340

UNITED STATES PATENT OFFICE.

CHARLES R. MABEE, OF BUFFALO, NEW YORK, ASSIGNOR TO MABEE PATENTS CORPORATION, OF DOVER, DELAWARE, A CORPORATION OF DELAWARE.

APPARATUS FOR PRODUCING LIVE-STOCK FEEDS.

Application filed January 14, 1921. Serial No. 437,310.

The object of the invention is to provide a process and apparatus for the treatment of farm products in the preparation of alcohol, carbonic acid, vegetable juices and live stock feeds.

The invention has special reference to a process and apparatus adapted for use upon farms, whereby vegetable juices may be obtained from sugar cane, sorghum fodder, sweet clover, root, and other like products.

The invention also involves, among other things, the use of internal mechanical pressure within a container, and the use of heat, moisture and ferments, applied to the farm crops during their treatment.

In the present commercial process of producing live stock feeds from coarse farm crops, such as those mentioned, either alone, or combined with other materials, in silos is slow, and lacking in efficiency due to the fact that heat, moisture, pressure, and if desired ferments, are not applied.

In the accompanying drawings:

Figure 1 is a longitudinal section, partly broken away of an apparatus suitable for the practice of my invention.

Referring more particularly to the drawings, 10 is a container, vertically disposed and of substantially cylindrical formation, closed at its upper extremity by the plate 11, and at its lower extremity by the plate 12 forming a conical shaped bottom.

The plate 12 is provided with air connection pipes shown at 13 provided with valves shown at 14, also with an outlet connection for solid and semi-solid materials shown at 15, provided with the regulating valve 16, for the removal of materials after treatment has been completed, also with the outlet connection 17, provided with the regulating valve 18, for the removal of liquid materials, also with the outlet connecting pipe casting 19 provided with connecting pipe 20 provided with a regulating valve 21, and the pipe connection 22 provided with a regulating valve 23. The outlet connecting pipe casting 19, and the outlet connection 17, at their orifices in the plate 12, are provided with the screens 24 and 25, in order to prevent the outflow of solid materials with the liquid materials. Just below the lower extremity of plate 12, are the burners 26 and 27, connected respectively by the pipes 29 and 30, with the feed pipe 31 which may be conveniently connected with a supply of fuel oil.

The pipe 22 in addition to being provided with a regulating valve 23, is also provided with the regulating valve 32, and is connected with the T 33 from which the pipe connection 34 leads to the pump shown at 35. The T 33 is connected with the reservoir 36 by the pipe connection 37 provided with a regulating valve 38.

Seated in the container wall 39 is the manhole 40 providing accessible means for communication with the lower part of the container 10, and opposite the manhole 40 in the container wall 39 is the pipe connection 41 provided with the regulating valve 42 providing means for the introduction of liquid materials.

The upper end plate shown at 11 is provided with the manhole shown at 43, also the pipe connection 44 provided with the regulating valve 45, also with the pipe connection 46 connected at its outer extremity with the T 47, also with the supports shown at 48, partly broken away, and connected at their upper extremity by the cross-beam 49.

Centrally positioned in the conical plate 11 is the casting 50 provided centrally thereof with the vertically disposed shaft 51, partly broken away, the upper portion of which shaft is connected with the chain-hoist apparatus shown at 52, suspended conveniently from the cross-beam 49.

Suitably connected with the lower extremity of the shaft 51, and within the container 10, is the gravity press shown at 53, connected by the arms 54 and the pivot 55 with the shaft 51. The gravity press 53 consists of two sections separated from one another at 56 by the plate 57 rigidly attached to each half or subdivision of the gravity press.

Passing through each sub-division of the gravity press is the pipe 58 connected with the hose 59, the upper extremity of which is attached to the connection shown at 46, and which provides a suitable supply of liquid materials. At 60 are shown spray nozzles connected to the lower extremity of the pipe shown at 58, and which nozzles provide suitable means for introducing liquid materials in spray form and distributing same within the container.

In the wall 39 of the container is the orifice 61 to which is connected the pipe 62 provided with the hinged closing connection 63, suitably adapted for the introduction of materials into the container 10. At 65 is shown supporting arms firmly attached to the container wall 39, adapted to support the gravity press 53 when it is lowered to the position shown at 66. The pipe connection 44 provided with the valve 45 is connected at 67 with the cooling coil shown at 68, the lower extremity of which at 69 is connected with the reservoir 70 provided with the outlet connecting pipe 71 in which is seated the valve 72.

The reservoir 70 is provided at 73 with the pipe connection 74 in which is seated the regulating valve 75. The connection 74 at 76 is connected with the cooling chamber shown at 80, provided with a cooling medium shown at 77, and which is introduced into the chamber 80 through the pipe connection 78 in which is seated the valve 79.

The pipe connection 74 after entering the cooler 80 is connected with the cooling coil shown at 81, which passes out from the container 80, at 82, where it is connected with the outlet pipe 83. The container 80 is also provided at 84 with the pipe connection 85 guarded by the valve 86, for the exit of the cooling medium shown at 77.

The pump 35 is connected by the pipe 87 guarded by the valve 88, with the T 47 to which is connected the pipe connection 46 attached at its opposite end to the upper end plate 11 of the container 10. The T 47 is also connected with the pipe connection 90 provided with the regulating valve 91.

In operating the apparatus, the materials to be treated are introduced in a comminuted condition into the container 10 through the orifice 61 surrounded outwardly by the pipe connection 62 to which is conveniently attached the hinged connection 63 and which is closed after the materials have been introduced.

The gravity press 53 may be constructed of any heavy material, preferably steel plate of sufficient weight to apply a pressure approximating 200 lbs. per square foot of contact surface. Before the gravity press 53 is allowed to descend upon the coarse farm crops to be treated, the materials introduced into the container 10 may be moistened by the introduction of liquid materials through the pipe 90 its intermediate connections and the spray nozzles shown at 60, or, the materials introduced into the container 10 may be suitably moistened with liquid materials taken from the lower portion of the container 10 through the screen 24, the outlet connecting pipe casting 19, the pipe connection 22, and the pipe connection 34, by means of the pump 35 and the pipe connection 87 attached thereto connected with the T 47 to which is connected the pipe connection 46 connected with the hose 59, and thereby to the connection 58 the lower portion of which is provided with the spray nozzles 60, in which case the valves 23, 32, 38, 88, 91, are all suitably adjusted to attain this object, or the materials introduced into the container 10 may be suitably moistened with liquid materials from the reservoir 36, which liquid materials may be an infusion of a ferment, such as diastase, and the like, which pass out of the reservoir 36 into the pipe connection 37 to the T 33 and therefrom through the pipe connection 34 to the pump 35 and from the pump 35 through the pipe connection 87 to the T 47 and therefrom through the pipe connection 46 to the hose connection 59 and therefrom through the pipe 58 and the spray nozzles 60, in which event, the valves 38, 32, 88, and 91, are suitably adjusted to obtain this objective.

When the materials so introduced have been suitably moistened with liquid materials, or with liquid materials containing a ferment, as diastase, by means of the chain hoist apparatus shown at 52, the gravity press 53 is lowered and its entire weight allowed to compress the materials to be treated, thereby reducing the space occupied thereby.

Mild heat, insufficient to inhibit action of the ferment or enzyme is then applied by means of the burners shown at 26 and 27, which are supplied by the pipes 29 and 30 with fuel oil from the connection shown at 31. In order to permit the escape of gases and vapors, the outer extremity of the gravity press 53 is so proportioned as to afford a suitable area of space between it and the inner surface of the wall 39.

The gases and vapors pass out of the upper end of the container through the pipe connection 44, the valve 45 therein being opened for that purpose. They enter the cooling coil shown at 68 and those susceptible of condensation without pressure are condensed in the coils 68 and pass therefrom into the reservoir 70 with those uncondensed, such as carbonic acid, which does not condense at atmospheric pressure, but which in practice is allowed to escape from the reservoir 70, at 73, into the pipe connection 74, and from thence into the cooling coils shown at 81, and from thence, at 82, into the pipe connection 83 by means of which they are led away. It is obvious that all valved connections are properly adjusted for such purpose, and that the cooling medium shown at 77 is permitted to flow continuously through the chamber 80 through the pipe connection 77 and the outlet pipe connection 85, the valves of which are suitably adjusted.

In practice, where the crops are green I find that it is not necessary to introduce liquid materials into the container, and in such cases, mild heat combined with pressure is applied for a suitable period of time, i. e. for an hour or more after which the liquid materials are permitted to flow from the lower end of the container through the screen 24 and the pipe 20 connected with the central hollow space in the outlet connecting pipe casting 19, in which event the valve 23 is closed and the valve 21 is opened, or, the liquid may be removed through the screen 25 by opening the valve 18 in the outlet connection 17.

When the liquid has been removed, and the valves adjusted, the entire contents of the container 10, or a portion thereof, may be removed from the lower end of the container by opening the valve 16 in the outlet pipe connection shown at 15. The pressure from the gravity press 53 to be ample to force the materials from the lower end of the container out through the outlet pipe shown at 15.

In case it is desired to remove the materials from the container in a dry state, mild heat is applied to the lower end plate 12 from the burners 26 and 27, but, it is preferred to remove the treated materials in a comparatively moist state, and to feed them to live stock immediately upon their exit from the container 10.

The pipe connections shown at 13, are utilized for the introduction of air into the lower end of the container, for the purpose of facilitating the drying of the treated materials.

In farm practice, the feed materials are withdrawn from the lower end of the container, from time to time, as required for feeding, after which the gravity press 53 is elevated, the hinged connection 63 is opened, and sufficient fresh materials are introduced through the orifice 61, to replace the materials removed through the pipe 15, after which the gravity press 53, is again lowered. By this procedure, the apparatus is filled and operating substantially continuously. It is obvious that each time new materials are introduced they may be moistened with water or with liquid containing a ferment as diastase.

Where it is desired to introduce a considerable amount of moisture into the container, liquid materials may be introduced through the pipe connection 41 guarded by the valve 42.

In explanation of this process, which is proving valuable on farms, where the ferment diastase is used to convert portions of the starches into sugars, the materials treated are maintained at a temperature below 142 degrees Fahrenheit, as a rule. The action of diastase on the fibrous and cellular matter, by this process where the materials are kept in a moist state in contradistinction to being submerged as in prior practice, is not well understood although leading chemical laboratories have endeavored to ascertain this action. Analysis made show a decrease in digestible protein after treatment to the extent of about 45%, and an increase of crude protein to the extent of about 30%, by the ordinary methods of analysis now employed. This is mentioned because much greater feeding results are obtained, in animal flesh, and milk, and the invention is deemed important from the standpoint of results obtained.

In practice, where the ferment yeast is used, the temperatures are permitted to lower accordingly, in order not to destroy the fermentative action of yeast.

An important feature of the invention is the moistening of the feed materials by liquid materials impregnated with diastase, or diastase and yeast, by dissolving, as far as possible, these ferments in liquid placed in the reservoir shown at 36, and the maintaining of suitable temperatures within the container to permit proper action of diastase, or diastase and yeast, upon the materials treated.

In practice, where both diastase and yeast ferments are employed, I first spread a heated infusion of diastase over the upper portion of the farm feeds and allow the infusion to seep down through the feeds to the lower end of the container. By this step sufficient heat is applied to the farm feeds to effect a conversion of starches into maltose. The temperature approximates 140 degrees Fahrenheit throughout the feeds. Later, a heated infusion of yeast, at a temperature regulated in accordance with the temperature of the feeds, is poured over the upper strata of feed and also allowed to seep down through the feeds. The temperature of the yeast infusion is such as when combined with the feeds results in a mean temperature approximating 100 degrees Fahrenheit.

I have found that where the materials are not submerged in liquids, that higher temperatures can be employed than where they are submerged in liquids, without corresponding injury to the action of diastase and yeast. In treating comminuted coarse farm crops with diastase and yeast, the action on the crops differs from the action of these ferments on cereal products, in that chemical analysis shows a smaller percentage of digestible protein after treatment than before treatment, and yet the feeds are greatly enhanced in value proven by tests.

The supporting arm firmly attached to the container wall 39, as shown at 65, provides suitable means for supporting the gravity press 63, in case repairs may be necessary.

It is obvious that other forms of apparatus may be employed to provide means for accomplishing similar results, and I do not confine the invention to the particular form shown in the drawing and described herein.

What I claim is:

Apparatus for the preparation of feeding materials including, in combination, a vertical container substantially closed at both its ends, means adjacent the top of the container to permit the introduction therein of materials for treatment, means adjacent the bottom of the container to permit the withdrawal of materials therefrom, said container being formed with an opening in the top thereof to permit the introduction therein of a liquid treating medium, a compression plunger disposed across said container, means carried by said plunger for spraying the treated medium upon materials in said container, and a flexible connection between said opening and said sprayer.

CHARLES R. MABEE.